United States Patent [19]
Yoshida

[11] Patent Number: 6,006,213
[45] Date of Patent: Dec. 21, 1999

[54] METHOD FOR LEARNING DATA PROCESSING RULES FROM GRAPH INFORMATION

[75] Inventor: Kenichi Yoshida, Highland Park, N.J.

[73] Assignee: Hitachi, Ltd., Tokyo, Japan

[21] Appl. No.: 08/412,106

[22] Filed: Mar. 28, 1995

Related U.S. Application Data

[63] Continuation of application No. 08/164,564, Dec. 10, 1993, abandoned, which is a continuation-in-part of application No. 07/872,140, Apr. 22, 1992, Pat. No. 5,353,384.

[30] Foreign Application Priority Data

| Apr. 22, 1991 | [JP] | Japan | 3-090308 |
| Dec. 10, 1992 | [JP] | Japan | 4-330200 |
| Mar. 26, 1993 | [JP] | Japan | 5-067884 |

[51] Int. Cl.$^6$ .................................................. G06F 15/18
[52] U.S. Cl. ............................... 706/14; 706/45; 706/46; 706/47; 706/61
[58] Field of Search .................. 395/20, 77; 706/14, 706/45, 46, 60, 61, 47

[56] References Cited

U.S. PATENT DOCUMENTS

| 4,939,680 | 7/1990 | Yoshida | 706/45 |
| 5,222,197 | 6/1993 | Teng et al. | 706/58 |
| 5,245,699 | 9/1993 | Ono | 706/48 |
| 5,261,037 | 11/1993 | Tse et al. | 706/60 |

OTHER PUBLICATIONS

J.R. Quinlan, "Induction of Decision Trees," Machine Learning, vol. 1, Kluwer Academic Publishers, pp. 81–106, 1986.

Tom M. Mitchell et al., Machine Learning, vol. 1, Kluwer Academic Publishers, pp. 47–80, 1986.

Quinlan, "Generating Production Rules From Decision Trees," Proc. 10th Int'l Conf. on Artificial Intelligence, pp. 304–307, Dec. 1987.

Mathur, "Graph Theoretic Knowledge Representation and Knowledge Organization", 1992 IEEE Int'l Conf. on Systems Man and Cybernetics, Oct. 18–21, 1992, pp. 1712–1717 vol. 2.

Yoshida et al, "Clip–Concept Learning from Interface Pattern—A Method to Find Typical Inference Pattern", Journal of Artificial Intelligence Society of Japan, Jul. 1992.

"CLIP: Concept Learning from Inference Patterns: A Method of Finding Typical Inference Patterns", Yoshida et al, Jul. 1991, Technical Papers pp. 1–33.

*Primary Examiner*—Tariq R. Hafiz
*Assistant Examiner*—Jason W. Rhodes
*Attorney, Agent, or Firm*—Antonelli, Terry, Stout & Kraus, LLP

[57] ABSTRACT

A learning method for performing a method of inductively learning rules from machine data, and a method for analyzing an inference process to learn rules useful for increasing efficiency by a common program are provided. Data desired to be classified is converted into a graph and is then input. The course of process by a computer is also converted into a graph and is then input. Then, patterns appearing in the input graph are extracted and patterns having a good evaluation result are output. The patterns are converted into rules for classification and rules for high-speed operation in accordance with a kind of the input graph, and are output.

8 Claims, 7 Drawing Sheets

| i | PATTERN | CONTRACTED RESULT OF GRAPH BY PATTERN | | | | EVALUATION VALUE |
|---|---|---|---|---|---|---|
| 0 | | P 1→2→3 ↘4 ↘5 | P 1→2→3 ↘6 ↘5 | N 1→2→3 ↘4 ↘7 | N 1→2→3 ↘4 ↘8 | 20 +7 +4 |
| 1 | [1·2]⁹ | P 9→3 ↘4 ↘5 | P 9→3 ↘6 ↘5 | N 9→3 ↘4 ↘7 | N 9→3 ↘4 ↘8 | 16 +6 +4 |
| 2 | [1·2]¹⁰ / 5 / [1·2]⁹ | P 10→3 ↘4 | P 10→3 ↘6 | N 9→3 ↘4 ↘7 | N 9→3 ↘4 ↘8 | 14 +7 +0 |
| 3 | [1·2·3]¹¹ / 5 / [1·2]⁹ | P 11↘4 | P 11↘6 | N 9→3 ↘4 ↘7 | N 9→3 ↘4 ↘8 | 12 +7 +0 |
| 4 | [1·2·3]¹¹ / 5 / [1·2·3]¹² | P 11↘4 | P 11↘6 | N 12↘4 ↘7 | N 12↘4 ↘8 | 10 +6 +0 |
| 5 | [1·2·3]¹¹ / 5 / [1·2·3]¹³ / 4 | P 11↘4 | P 11↘6 | N 13↘7 | N 13↘8 | 8 +6 +0 |

FIG. 1

```
ALGORITHM  CLIP (G_in, C, L, W)
   INPUTS   G_in: COLORED DIGRAPH
            C: EVALUATION METHOD
            L, W: SEARCH PARAMETER
   OUTPUT   V_i: COMBINATION OF 0 OR MORE PATTERNS
                 CONTAINED IN G_in
   BEGIN
       V_0 ← 0;  B ← {V_0};  i ← 1
       REPEAT L DO
          B_next ← 0
          FOR EACH V_tmp ∈ B TO DO
             G_tmp < GRAPH OF G_in CONTRACTED BY PATTERN
                CONTAINED IN V_tmp
             B_next ← B_next ∪ PATTERN MODIFICATION
                                         (G_tmp, V_tmp)
             FOR EACH V_tmp1 ∈ B TO DO
             FOR EACH V_tmp2 ∈ B TO DO
                IF V_tmp1 ≠ V_tmp2  THEN
                   V_new ← V_tmp1 ∪ V_tmp2
                   ADD V_new TO B_next
          B < SELECT W VIEWS FROM B_next ON THE BASE
             OF C
       V_i < SELECT BEST VIEW FROM B_next ON THE BASE OF
             C
       RETURN V_i
   END PROCEDURE  PATTERN MODIFICATION (G, V)
   INPUTS   G: COLORED DIGRAPH
            V: COMBINATION OF 0 OR MORE PATTERNS
   OUTPUT   B: COMBINATION OF 0 OR MORE VIEWS
   BEGIN
       B ← 0
       FOR TEMPORARY PATTERNS P IN G TO DO
          V_new ← V ∪ {INVERSELY CONTRACTED PATTERN OF P}
          ADD V_new TO B
       RETURN B
   END
```

| i | PATTERN | CONTRACTED RESULT OF GRAPH BY PATTERN | EVALUATION VALUE |
|---|---|---|---|
| 0 | | | 20 +7 +4 |
| 1 | [1·2] 9 | | 16 +6 +4 |
| 2 | [1·2] 10, [1·2] 9 | | 14 +7 +0 |
| 3 | [1·2·3 / 5] 11, [1·2] 9 | | 12 +7 +0 |
| 4 | [1·2·3 / 5] 11, [1·2·3] 12 | | 10 +6 +0 |
| 5 | [1·2·3 / 5] 11, [1·2·3 / 4] 13 | | 8 +6 +0 |

% latex paper
% bibtex paper
% latex paper
% latex paper
% dvi2ps paper > ps
% ghostview ps

FIG. 7B

% latex paper
% dvi2ps paper > ps
% ghostview ps

METHOD FOR LEARNING DATA PROCESSING RULES FROM GRAPH INFORMATION

This application is a continuation of application Ser. No. 08/164,564 filed on Dec. 10, 1993, now abandoned, which is a Continuation-In-Part of application Ser. No. 07/872,140 filed Apr. 22, 1992, now U.S. Pat. No. 5,353,384.

BACKGROUND OF THE INVENTION

1. Field of the Invention

The present invention relates to preparation of a knowledge base indispensable to an expert system, and more particularly to a learning system for providing to the expert system a mechanism for automatically preparing the knowledge base which has been made by a person heretofore.

2. Description of the Related Art

Heretofore, a machine learning method has been studied by being broadly divided into two methods including a method of learning a rule from data inductively and a method of analyzing an inference process to learn a rule for increasing efficiency.

As an example of the former, J. R. Quinlan, "Induction of Decision Trees", Machine Learning, pp. 81106, 1986 describes a method of inductively learning a rule from data.

As an example of the latter, Tom M. Mitchell, Richard M. Keller and Smadar T. Kedar-Cabelli, "Explanation-Based Generalization: A Unifying View" Machine Learning Vol. 1, No. 1, pp. 47–80, 1986 describes a method of efficiently solving a similar example after learning by storing an application series of knowledge necessary for solution of a specific problem.

Further, as a method utilizing the algorithm similar to the present invention, "Concept Learning from Inference Pattern" by Kenichi Yoshida and Hiroshi Motoda, Journal of Artificial Intelligence Society of Japan, pp. 119–129, July 1992 has been proposed for the purpose of attaining the object similar to the latter.

The prior art has a problem that separate programs for performing the two methods are required when both functions are necessary in a computer.

For example, when there is considered an operation supporting system for a computer which analyzes operation instructions given halfway by the user and infers the subsequent operation to perform the operation automatically, the pure inductive learning method is excessively influenced by "noise due to the operation for processing [a suddenly] incoming electronic mail" [excessively] when the operation history of the computer is analyzed and as a result, it cannot be put into practice. Further, the pure deductive learning requires a knowledge base capable of analyzing all operations or user's intention and cannot be practically realized either.

SUMMARY OF THE INVENTION

It is an object of the present invention to provide a learning method for attaining two learning functions within the same program to solve a problem.

The object is achieved by a machine learning method including the steps of analyzing an input graph, extracting a set of patterns frequently appearing in the graph, evaluating the extracted pattern based on the resulting graph size reduction, and outputting a pattern having a good evaluation result.

Data desired to be classified is converted into a graph and is then input. The course of a process by a computer is also converted into a graph and is then input. Patterns appearing in the input graph are then extracted and patterns having good evaluation results are output. A pattern is converted into a rule for classification or a rule for high-speed operation in accordance with a kind of the input graph and is then output, so that two kinds of machine learning works which could not be processed heretofore by the same method can be implemented by the same method.

BRIEF DESCRIPTION OF THE DRAWINGS

FIG. 1 shows a process procedure of an embodiment of the present invention;

FIG. 2 shows the course of graph processes selected as examples for explaining the present invention;

FIGS. 7A and 7B show collected examples of programs used by operation of the computer user in order of operation;

DESCRIPTION OF THE PREFERRED EMBODIMENT

Figure 3:
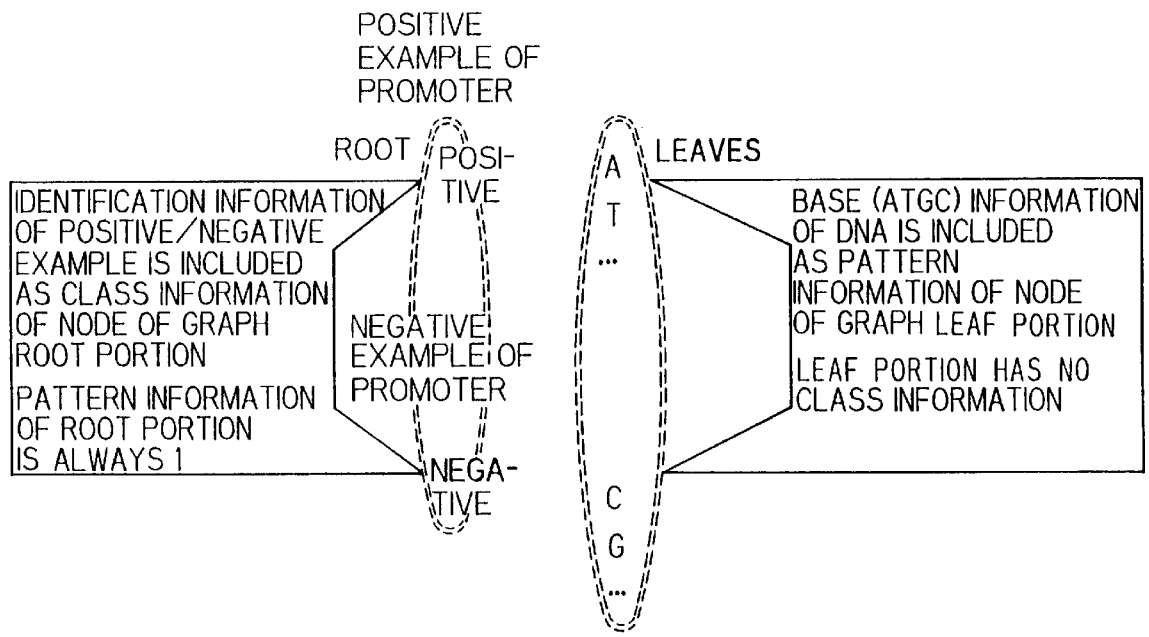
FIG. 3 is a schematic diagram illustrating a method of converting data desired to be classified into a graph.

An embodiment of the present invention is now described with reference to the accompanying drawings.

FIG. 1 shows a basic algorithm of the present invention. Data desired to be classified and the course of a process by a computer are converted into a graph Gin and are then input to the computer. The conversion method is described later. Then, patterns appearing in the input graph Gin are extracted by the algorithm shown in FIG. 1 and a combination (view) of patterns having good evaluation results on the basis of an evaluation method C input separately is extracted. Finally, the extracted patterns are converted into rules for classification or rules for high-speed operation in accordance with a kind of the input graph and are then output. L and W are search parameters and proper numbers are input therefor.

The most important operation in the algorithm is pattern modification. A temporary pattern in the pattern modification is a pattern constituted by two connected nodes in a contracted graph. An inversely contracted pattern of the temporary pattern is a pattern corresponding to the temporary pattern in the input graph Gin before contraction. When one or both of the nodes of the temporary pattern are contracted nodes and correspond to a pattern composed of a plurality of nodes in the input graph Gin, the inversely contracted pattern is a complicated pattern. The pattern modification is repeated as a parameter i in the algorithm, is increased, and therefore a complicated pattern is extracted.

When the temporary pattern is taken out by the pattern modification, only patterns having the information of mutually exclusive events, that is, class information attached to the root node are extracted as the pattern. Thus, as described later, the taken-out pattern can be interpreted as a classification rule.

FIG. 2 shows an example for explaining the course of processes of the algorithm shown in FIG. 1. In FIG. 2, the numbers 1–13 in the "contracted result of graph pattern" column are the graph color which corresponds to pattern information. The mark "P" and "N" are the graph color which corresponds to class information. How to make these color and graph is explained later 5 and 1 are input as L and W. Respectively, and as the evaluation method C the following expression is assumed to be designated with respect to the contracted graph. In the designation of the evaluation method, a numerical expression including some data relative to the properties of a graph such as the number of nodes and the number of links is designated and the program realizing the algorithm evaluates the numerical expression actually to select the expression having a large value, although the expression having a small value may be selected depending on the nature of problems. Description is made by using the following designation.

---

Evaluation Expression

= Number of Nodes + Sum Total of values calculated
by f concerning color expressing pattern
information in graph f (color)

= Evaluation Expression Number of Nodes + Sum
Total of f(Pattern) (I) f(Pattern) = max (1, Square
of Number of Classes for the nodes which have the
Pattern)

---

When i is 0, Vtmp is empty and accordingly the contracted graph is Gin (input graph) itself. At this time, in FIG. 2, the number of nodes in the contracted graph is 20, and the value of the first term of equation (1) is 20. For each pattern information in the contracted graph, the number of the classes for the nodes which have the pattern information are calculated, and the square of the numbers are summarized as the value of the second term of equation(2). In "i=0" row of FIG. 2, 4 graph nodes have color 1 (pattern 1), and 2 of them also have color P (i.e. class P) and remaining 2 have color N (i.e. class N). Thus f(pattern 1) is 4(square of 2, P and N). In "i–0" row of FIG. 2, 4 graph nodes have color 2, and none of them has class information ("P" or "N"), thus f(pattern 2) is 1(maximum of 1 and 0). Similarly, f(pattern 3) is 1, f(pattern 4) is 1, f(pattern 5) is f1, f(pattern 6) is 1, f(pattern 7) is 1, f(pattern 8) is 1. Thus the sum of f(pattern) is 11, and the value of equation (1) is 31 (=20+11). Accordingly, since f=1 for the pattern information 2 to 8, giving 7 in total and the pattern information 1 has two P and N, which gives f=4 and the evaluated value is 31 in total. In this case, "1, 2", "1, 4", "1, 5", "1, 6", "1, 7" and "1, 8" are extracted as the temporary patterns and these are coincident with the inversely contracted pattern. Further, it is assumed that a view including only one pattern "1, 2" is selected. This selection is based on the value of equation (1). The view (i.e. combination of patterns) which results better value of equation (1) is selected, and the assumption "a view including only one pattern 1,2 is selected" is for the explanation.

At this time, the pattern "2, 3" is also considered as the pattern having two nodes, while both of the nodes have no class information of the mutually exclusive events P and N and accordingly extraction of the pattern is not made.

When i is 1, Vtmp includes only the pattern "1, 2". This is assumed to be named as a view 9. The contracted graph is different from Gin. At this time, in FIG. 2, the number of nodes in the contracted graph is 16, and the value of the first term of equation (1) is 16. In "i=1" row of FIG. 2, 4 graph nodes have color 9 (pattern 9), and 2 of them also have color P (i.e. class P) and remaining 2 have color N (i.e. class N). Thus f(pattern 9) is 4 (square of 2, P and N). In "i=1" row of FIG. 2, 4 graph nodes have color 3, and none of them have class information ("P" or "N"), thus f(pattern 2) is 1 (maximum of 1 and 0). Similarly, f(pattern 4) is 1, f(pattern 5) is 1, f(pattern 6) is 1, f(pattern 7) is 1, f(pattern 8) is 1. Thus the sum of f(pattern) is 10, and the value of equation (1) is 26(=16+0). In this case, as the temporary patterns, "9, 3", "9, 4", "9, 5", "9, 6", "9, 7" and "9, 8" are extracted and these patterns become the inversely contracted patterns "1, 2, 3", "1, 2, 4", "1, 2, 5", "1, 2, 6", "1, 2, 7" and "1, 2, 8". Further, it is assumed that the view including two patterns "1, 2, 5" and "1, 2" are selected.

When i is 2, Vtmp includes the patterns "1, 2, 5" and "1, 2". The patterns are assumed to be named as view nodes 10 and 9, respectively. At this time, in FIG. 2, the number of nodes in the contracted graph is 14, and the value of the first term of equation (1) is 14. In "i=2" row of FIG. 1 2, 2 graph nodes have color 9 (pattern 9), and all of them also have color N (i.e. Class N). Thus f(pattern 9) is 19 square of 1, N). In "i=2" row of FIG. 2, 2 graph nodes have color 10 (pattern 10), and all of them also have color P (i.e. class P). Thus f(pattern 10) is 1 (square of 1, P). In "i=2" row of FIG. 2, 4 graph nodes have color 3, and none of them has class information ("P" or "N"), thus f(pattern 3) is 1 (maximum of 1 and 0). Similarly, f(pattern 4) is 1, f(pattern 6) is 1, f(pattern 7) is 1, f(pattern 8) is 1. Thus the sum of f(pattern) is 7, and the value of equation (1) is 21(=14+7). In this case, as the temporary patterns, "10, 3", "10, 4", "10, 6", "9, 3 ", "9, 4", "9, 7" and "9, 8" are extracted and these patterns become the inversely contracted patterns "1, 2, 5, 3", "1, 2, 5, 4", "1, 2, 5, 6", "1, 2, 3", "1, 2, 4", "1, 2, 7" and "1, 2, 8". Further, the view including two patterns "1, 2, 5, 3" and "1, 2" is assumed to be selected.

When i is 3, Vtmp includes the patterns "1, 2, 5, 3" and "1, 2". These patterns are assumed to be named as view nodes 11 and 9, respectively. At this time, in FIG. 2, the number of nodes in the contracted graph is 12, and the value of the first term of equation (1) is 12. In "i=3" row of FIG. 2, 2 graph nodes have color 9 (pattern 9), and all of them also have color N (i.e. class N). Thus f(pattern 9) is 1 (square of 1, N). In "i=3" row of FIG. 2, 2 graph nodes have color 11 (pattern 11), and all of them also have color P (i.e. class P). Thus f(pattern 11) is 1 (square of 1, P). In "i=3" row of FIG. 2, 2 graph nodes have color 3, and none of them has class information ("P" or "N"), thus f(pattern 3) is 1 (maximum of 1 and 0). Similarly, f(pattern 4) is 1, f(pattern 6) is 1, f(pattern 7) is 1, f(pattern 8) is 1. Thus the sum of f(pattern) is 7, and the value of equation (1) is 19 (=12+7). In this case, the temporary patterns, "11, 4", "11, 6", "9, 3", "9, 4", "9, 7" and "9, 8" are extracted and these patterns become the inversely contracted patterns "1 , 2, 5, 3, 4", "1 , 2, 5, 3, 6", "1, 2, 3", "1, 2, 4", "1, 2, 7" and "1, 2, 8" . Further, the view including two patterns "1, 2, 5, 3" and "1, 2, 3, 4" is assumed to be selected.

When i is 4, Vtmp includes the patterns "1, 2, 5, 3" and "1, 2, 3". These patterns are assumed to be named as view nodes 11 and 12, respectively. At this time, in FIG. 2, the number of nodes in the contracted graph is 10, and the value of the first term of equation (1) is 10. In "=4" row of FIG. 2, 2 graph nodes have color 12 (pattern 12), and all of them also have color N (i.e. class N). Thus f(pattern 12) is 1 (square of 1,N). In "i=4" row of FIG. 2, 2 graph nodes have color 11 (pattern 11), and all of them also have color P (i.e. class P). Thus f(pattern 11) is 1 (square of 1,P). In "i=4" row of FIG. 2, 3 graph nodes have color 4 and none of them has class information ("P" or "N"), thus f(pattern 4) is 1 (maximum of 1 and 0). Similarly, f(pattern 6) is 1, f(pattern 7) is 1, f(pattern 8) is 1. Thus the sum of f(pattern) is 6, and the value of equation (1) is 16(=10+6). In this case, as the temporary patterns, "11, 4", "11, 6", "12, 4", "12, 7" and "12, 8" are extracted and these patterns become the inversely contracted patterns "1, 2, 5, 3, 4", "1, 2, 5, 3, 6", "1, 2, 3, 4", "1, 2, 3, 7" and "1, 2, 3, 8". Further, it is assumed that the view including two patterns "1, 2, 5, 3" and "1, 2, 3, 4" is selected.

When i is 5, Vtmp includes the patterns "1, 2, 5, 3" and "1, 2, 3, 4". These patterns are assumed to be nodes 11 and 13, respectively. At this time, in FIG. 2, the number of nodes in the contracted graph is 8, and the value of the first term of equation (1) is 8. In "i=5" row of FIG. 2, 2 graph nodes have color 13 (pattern 13), and all of them also have color N (i.e. class N). Thus f(pattern 13) is 1 (square of 1, N). In "i.–5" row of FIG. 2, 2 graph nodes have color 11 (pattern 11), and all of them also have color P (i.e. class P). Thus f(pattern 11) is 1 (square of 1,P). In "i=5" row of FIG. 2, 1 graph node has color 4, and it does not have class information ("P" or "N"), thus f (pattern 4) is 1 (maximum of 1 and 0). Similarly, f (pattern 6) is 1, f (pattern 7) is 1, f (pattern 8) is 1. Thus the sum of f(pattern) is 6, and the value of equation (1) is 14(=8+6).

FIG. 3 illustrates the method of converting data desired to be classified into a graph. From the nucleotide sequence of DNA, it is assumed that the classification rule as to whether the sequence is a promoter or not is inductively from data. In this case, Gin is a set of small graphs each corresponding to the DNA sequence. The individual small graph is a graph of a depth 1 constituted by one root node and end node number of which is equal to the length of the DNA sequence. Each graph node has the information about pattern and class as node color. In FIG. 3, the root node of each graph has a color that corresponds to the class information "positive" or "negative". Each leaf nodes has a color that corresponds to the nucleotide, i.e. A,T, C and G, in the DNA sequence.

The pattern information of the root node has always 1 and the class information has identification information of the positive example and/or the negative example. The pattern information of the leaf node has the nucleotide information of the DNA sequence and has no class information.

Figure 4:
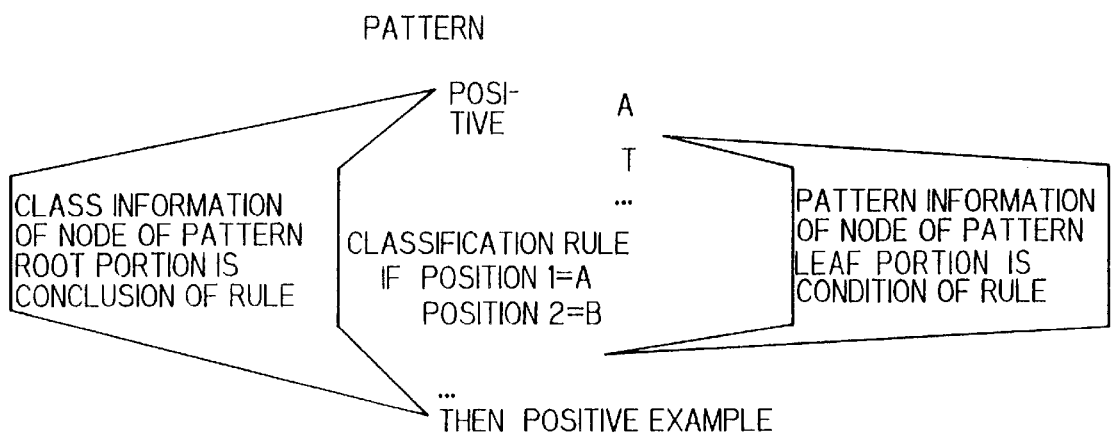
FIG. 4 is a schematic diagram illustrating a method of converting a pattern into a rule for classification.

After the data has been converted into the graph by means of the above method, the patterns are extracted by the algorithm of FIG. 1. FIG. 4 illustrates the method of converting an extracted pattern into a rule for classification. If the class information of the root node of the extracted pattern is made to be a conclusion of the classification rule and the pattern information of the leaf nodes is made to be a condition, this forms [a] classification rules [can be] for each pattern.

Figure 5:
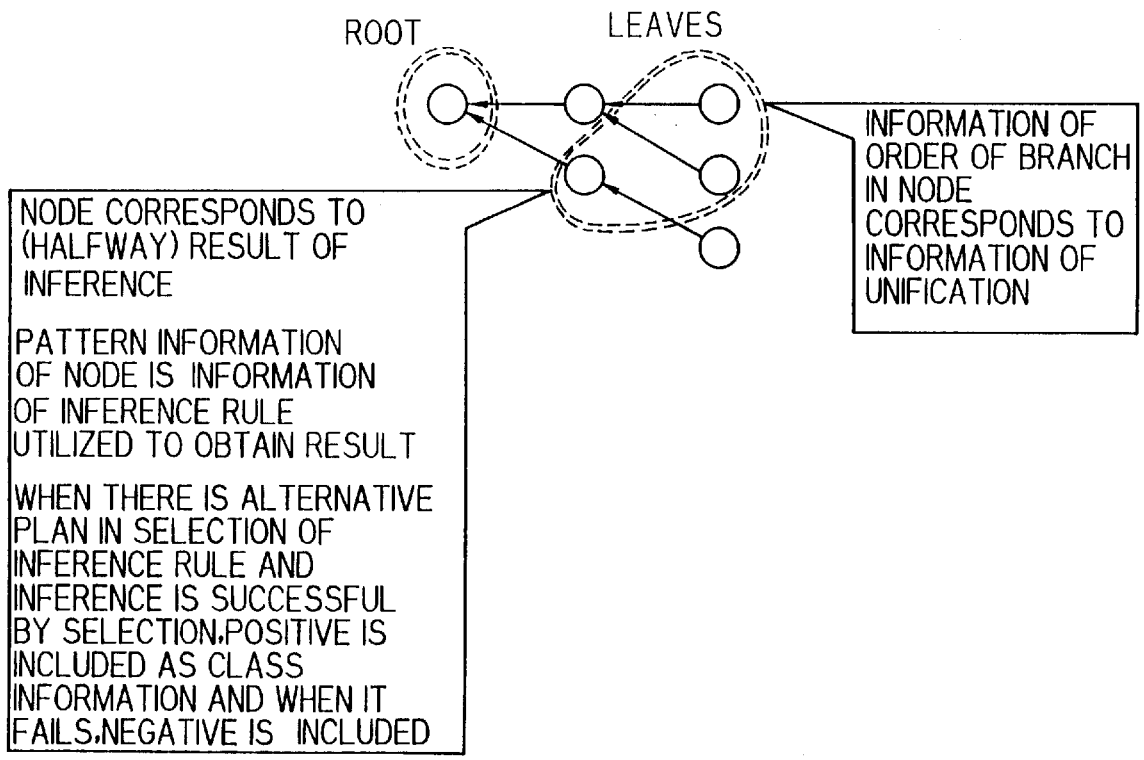
FIG. 5 is a schematic diagram illustrating a method of converting the course of the process by a computer into a graph.

FIG. 5 illustrates the method of converting the course of the process by the computer into the graph. In this case, the graph can be regarded as a kind of proof tree. Each node corresponds to the (intermediate) conclusion appearing in the inference process. The inference rule utilized to obtain the result is stored as the pattern information. As the class information, the "positive/negative" information is stored depending on whether the inference has been successful by selection of an alternative plan which is provided for selection when a plurality of inference rules are applicable. When there is no alternative plan, the "positive" may be stored, although there is no problem even if the class information is not stored. Further, information indicative of the order of branch in the node is attached to indicate information of the unification.

The information of the unification to be stored is different depending on the used inference system. For example, if the original calculation process is made by prolog, information indicative of the order of term in the body portion is stored as information indicative of the order of the branch. Since the prolog process is a general proof process, information to be stored can be selected with reference to an example of prolog even if the inference system other than the prolog is utilized.

Figure 6:
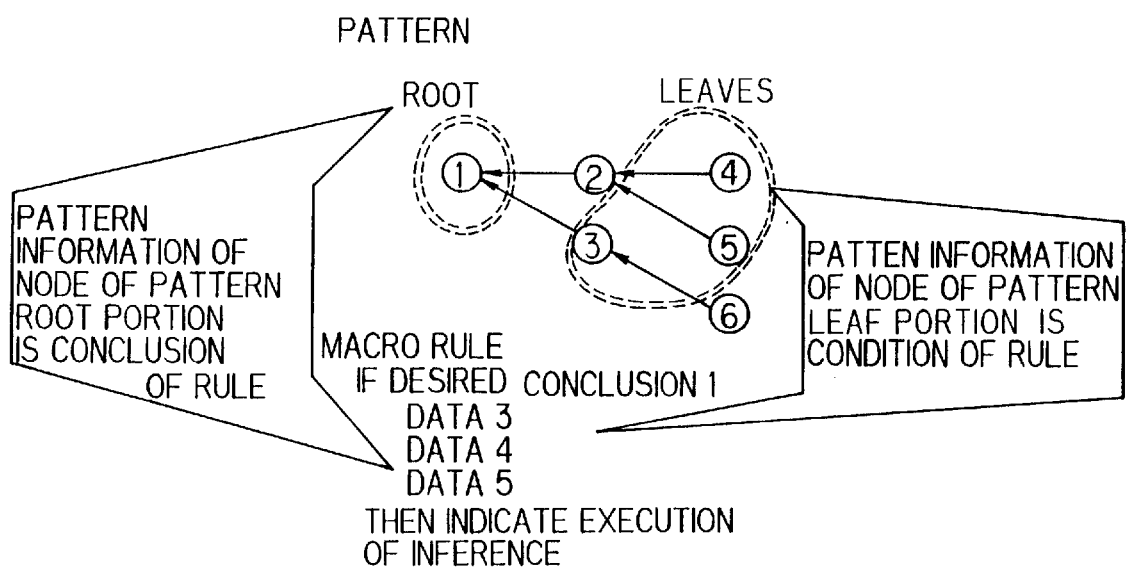
FIG. 6 is a schematic diagram illustrating a method of converting a pattern into a rule for highspeed operation.

In the above method, after the course of process by the computer has been converted into a graph, the pattern can be extracted by the algorithm of FIG. 1. FIG. 6 illustrates the method of converting the pattern into the rule for high-speed operation. If the pattern information of the root node having "positive" as the class information of the root portion, of the extracted patterns is made to be the conclusion and the pattern information of the leaf nodes is made to be the condition, the rule for high-speed operation with which the inference succeeds can be prepared from each pattern. The rule with which the inference fails can be extracted from the pattern having "negative" as the class information of the root node.

In the embodiment, in order to demonstrate the simple realization method on the computer, the algorithm for evaluating the extracted pattern every time has been described. This method has a defect in that the processing speed is slow although the realization is easy. This defect can be removed to attain the high-speed processing by substituting the method described below for evaluation of the combination of the pattern stored in the variable Bnext in the algorithm of FIG. 1.

The combination of the pattern stored in the variable B is first actually evaluated in accordance with the above evaluation method. Then, when the combination of the pattern of Bnext is evaluated, the substitute evaluation result defined by the following expression is used for the combination of the pattern registered by the pattern modification of the combination V of the pattern stored in the variable B.

| Evaluation Expression |
| --- |
| = Evaluation result of V before modification |
| − the number of the temporary patterns extracted pattern modification |
| + g |
| + h |
| − f (color of root of the temporary pattern) |

The following steps calculates the value of g:
1. Make a new graph $G_{new}$ by removing the temporary pattern from $G_{in}$.
2. Calculate f for the pattern color of the root node of the temporal pattern for $G_{new}$.
3. Assign the result to the value of g.

The following steps calculate ;the value of h:
1. Make a new graph $G_{new}$ by extracting the temporary pattern only from $G_{in}$. In this case, $G_{new}$ is made up of the temporary pattern in $G_{in}$.
2. Calculate f for the pattern color of the root node of the temporal pattern for $G_{new}$.
3. Assign the result to the value of h. Calculate f for the pattern color of the root node of the temporal pattern for $G_{new}$.

The second term of the evaluation expression is a prediction value of the reduced number of nodes (first term of the original evaluation expression), and the third and subsequent terms are prediction values of the reduced number in the second term of the original evaluation expression and may be a different expression if it represents the tendency thereof.

An average of the evaluated results of Vtmp1 and Vtmp2 is used as the substitute evaluation result for the combination of the patterns registered by the merging operation of the combination of Vtmp1 and Vtmp2 of the pattern stored in the variable B.

Usually, since the combination of the patterns stored in the variable B is smaller in number than the combination of the patterns stored in the variable Bnext, the number of times of the evaluation of the pattern combination can be reduced by the substitute evaluation method. The evaluation requires the contraction process of the graph, because the number of times of the contraction process requiring the processing time can be reduced by reducing the number of times of evaluation, the high-speed operation can be attained as the whole algorithm.

The similar algorithm is utilized in the above mentioned paper "Concept Learning from Inference Pattern by Kentichi Yoshida and Hiroshi Motoda, Journal of Artificial Intelligence Society of Japan, pp. 119–129, July 1992, while this paper does not consider information of the class to be classified, success or failure of the process and the mutually exclusive event. Further, in the learning method described in the above paper, the data desired to be classified can not be converted into a graph to be input and the pattern cannot be converted into the rule for classification.

Further, the present invention can be expanded to prepare the program utilizing the learning result. FIGS. 7A and 7B show learning of operation history of a computer as an example for explaining this feature, and an example of partial preparation of a program by this.

FIGS. 7A and 7B show examples of the operation histories of a computer for preparation of a document. The user of the computer uses the LaTeX (main program for analyzing the file in which a document is stored) as a formatting system, the bibtex (program for searching for references from output of the LaTeX) as a reference searching system and the dvi2ps (program for preparing a printing command from output of the LaTeX) and the ghostview (program for analyzing the printing command to display it on a screen) as a display system of the formatted of document a fair copy. In the history (a), LaTeX command is in plural times in order to process the references from the specification of the LaTeX and the bibtex.

It is considered that the operation shown in FIG. 7A is divided into three commands "searching operation of references" of the first half and three commands "formatting and display operation" of the second half. In the initial stage of preparation of the document, the whole process shown in FIG. 7A has been performed every time, while a reference is not changed very much in the proofreading stage of the second half and accordingly only steps of the second half may be executed (FIG. 7B).

Figure 8A:
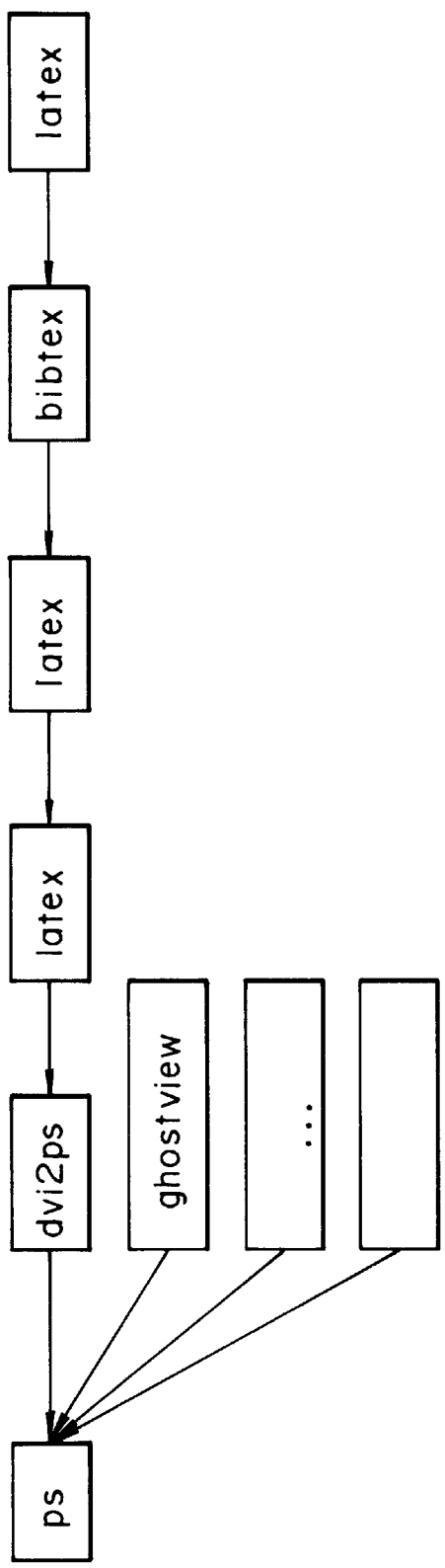
FIGS. 8A and 8B show graphed examples of the programs collected in order of operation.
Figure 8B:
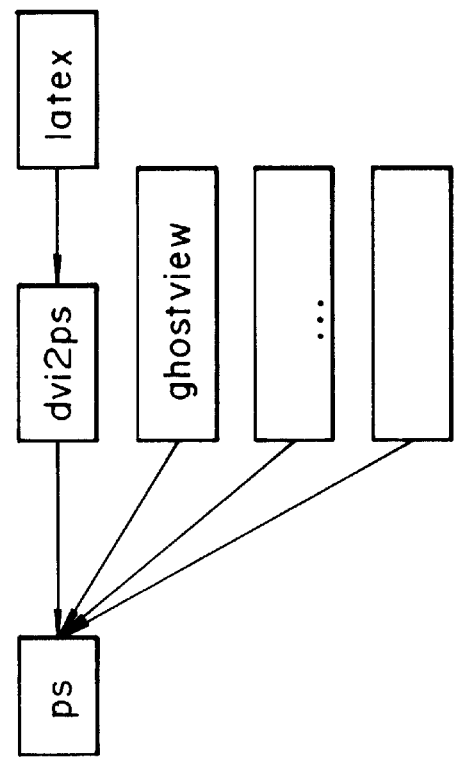

FIGS. 8a and 8B show examples of graph representation for analyzing the operation histories in the present invention. If such graphs which are a collection, in order of operation, of programs used in accordance with operation of the user is analyzed by the algorithm of FIG. 1, "searching operation of references", "document formatting and display operation" and the like can be learned as a macro operation. Further, whether the operation history of the user is coincident with the first half of the learned macro operation or not is examined, and when it is coincident, the operation of the second half can be performed automatically. That is, by performing the operation of the first half by the user, the program for performing the operation of the second half can be prepared and the user can perform the operation of the second half without designation of the next command by the user.

Figure 9:
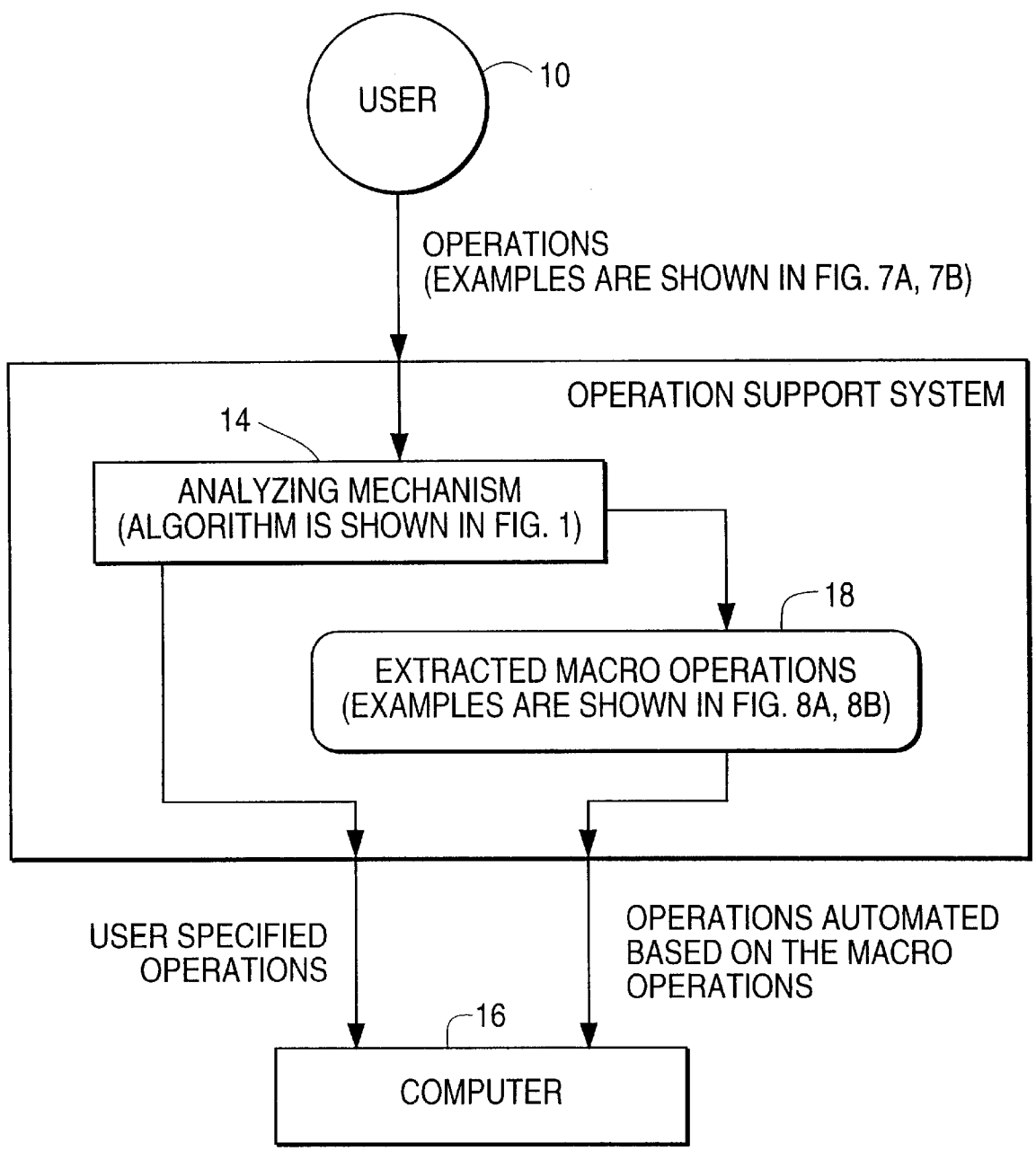
FIG. 9 shows an operation supporting system for implementing the process procedure of the present invention.

FIG. 9 illustrates an operation supporting system for implementing the process procedure of the present invention. Particularly, as shown in FIG. 9 a user inputs to the operation support system 12 various commands to cause the execution of various programs as illustrated in FIG. 7A and 7B. These programs, for example, LATEX causes various analyzing operations to be performed by the analyzing mechanism 14. The analyzing mechanism 14 performs the analyzing operations in accordance with the algorithm shown in FIG. 1. An indication of the user specified operations is supplied to the computer 16. A mechanism is also provided in the operation supporting system 12 so as to evaluate extracted macro operations provided by the analyzing mechanism 14. The mechanism 18 evaluates the extracted macro operations by determining whether the extracted macro operations satisfy a predetermined condition and provides an evaluation result. Thereafter, patterns included in the extracted patterns are selected based upon the evaluation result. The selected pattern is then outputted. The computer 16 receives the output from the mechanism 18. The computer 16 learns the operation performed by the user and automatically performs subsequent operations by inferring such subsequent operations from the learned operations.

As apparent form the above embodiment, according to the present invention, even if separate programs are required in the prior art, two learning functions can be provided by the same program. Furthermore, the program utilizing the learning result can be prepared automatically.

I claim:

1. A method of learning in a computer, comprising the steps of:

converting data desired to be processed into graph information;

inputting said graph information representative of a graph;

analyzing said graph information and extracting patterns appearing in said graph information;

evaluating the extracted patterns to determine whether the extracted patterns satisfy a predetermined condition and outputting evaluation result information indicating a result of the evaluation;

selecting patterns included in the extracted patterns based on the evaluation result information and outputting the selected patterns; and converting the selected patterns into a data processing rule to be output.

2. A method of learning in a computer, comprising the steps of:

converting data desired to be classified into graph information;

inputting said graph information;

analyzing said graph information and extracting patterns appearing in said graph information;

evaluating the extracted patterns to determine whether the extracted patterns satisfy a predetermined condition and outputting evaluation result information indicating a result of the evaluation;

selecting patterns included in the extracted patterns based on the evaluation result information and outputting the selected patterns; and converting the selected patterns into a rule for classification to be output.

3. A method of learning in a computer, comprising the steps of:

converting the course of a process into graph information;

inputting said graph;

analyzing said graph information and extracting patterns appearing in said graph information;

evaluating the extracted patterns to determine whether the extracted patterns satisfy a predetermined condition and outputting an evaluation result indicating result of the evaluation information;

selecting patterns included in the extracted patterns based on the evaluation result information and outputting the selected patterns;

converting the selected patterns into a rule for high-speed operation of a process to be output.

4. A method of learning in a computer, comprising the steps of:

converting data desired to be processed into graph information;

inputting said graph information representative of a graph;

analyzing said graph information and extracting patterns appearing in said graph information;

evaluating the extracted patterns to determine whether the extracted patterns satisfy a predetermined condition and outputting evaluation result information indicating a result of the evaluation;

selecting patterns included in the extracted patterns based on the evaluation result information and outputting the selected patterns; and converting the selected patterns into a data processing rule to be output;

wherein information of a mutually exclusive event including success and failure of a process and a class to be classified is input together with the graph information.

5. A method of learning according to claim 4, wherein extraction of the patterns is performed starting from a portion with the information of a mutually exclusive event in said graph information.

6. A method of learning according to claim 4, wherein the step of evaluating the extracted patterns comprises the steps of:

examining second graph information coincident to the extracted patterns and reducing the evaluation result information for the extracted patterns in the coincident graph information that correspond to a plurality of kinds of mutually exclusive events.

7. An operation supporting system for supporting the learning of operations by a computer, said operation system comprising:

a mechanism for converting data desired to be classified into graph information representative of a graph to be input;

a mechanism for inputting said graph information;

a mechanism for analyzing said graph information and extracting a pattern appearing in said graph information;

a mechanism for converting the extracted pattern into a rule for classification to be output;

a mechanism for outputting an extracted pattern by determining whether the extracted pattern satisfies a predetermined condition and outputting evaluation result information indicating a result of the evaluation; and a mechanism for selecting a pattern included in the extracted pattern based on the evaluation result information and outputting the selected pattern;

wherein operations performed by an user are learned by the computer and subsequent operations of the user are inferred from the learned operations and performed automatically.

8. A method of learning in a computer, comprising the steps of:

converting data desired to be classified and/or a course of a process to be performed by said computer into graph information;

inputting said graph information representative of a graph;

analyzing said graph information and extracting patterns appearing in said graph information, said extracted patterns include mutually exclusive events;

evaluating the extracted patterns to determine whether the extracted patterns satisfy a predetermined condition and outputting evaluation result information indicating a result of the evaluation;

selecting patterns included in the extracted patterns based on said evaluation result information and outputting the selected patterns;

converting the selected patterns into a data processing rule to be output; and outputting said data processing rules including rules for classification or rules for high-speed operation which are converted from the selected patterns in accordance with a kind of input graph.

* * * * *